(12) United States Patent
Matsuda et al.

(10) Patent No.: US 12,738,559 B2
(45) Date of Patent: Sep. 15, 2026

(54) BATTERY PACK AND VEHICLE

(71) Applicant: TOYOTA JIDOSHA KABUSHIKI KAISHA, Toyota (JP)

(72) Inventors: Ryo Matsuda, Toyota (JP); Yoshihiko Hiroe, Toyota (JP); Taro Matsushita, Toyokawa (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 686 days.

(21) Appl. No.: 18/200,234

(22) Filed: May 22, 2023

(65) Prior Publication Data

US 2023/0387497 A1 Nov. 30, 2023

(30) Foreign Application Priority Data

May 30, 2022 (JP) ................................ 2022-087643

(51) Int. Cl.
*H01M 10/6551* (2014.01)
*B60L 50/64* (2019.01)
*H01M 10/647* (2014.01)

(52) U.S. Cl.
CPC ......... *H01M 10/6551* (2015.04); *B60L 50/64* (2019.02); *H01M 10/647* (2015.04); *H01M 2220/20* (2013.01)

(58) Field of Classification Search
None
See application file for complete search history.

(56) References Cited

U.S. PATENT DOCUMENTS

2004/0058233 A1* 3/2004 Hamada .............. H01M 10/658 429/120
2019/0109354 A1* 4/2019 Yamashita ........ H01M 10/6551

FOREIGN PATENT DOCUMENTS

| | | |
|---|---|---|
| JP | H10-092394 A | 4/1998 |
| JP | 2010-062093 A | 3/2010 |
| JP | 2015-111493 A | 6/2015 |
| JP | 2017-004689 A | 1/2017 |
| JP | 2022-062288 A | 4/2022 |

OTHER PUBLICATIONS

NASA, 1972 Lunar Rover Vehicle (Year: 1972).*

* cited by examiner

*Primary Examiner* — Jonathan G Leong
*Assistant Examiner* — Claire A Rutiser
(74) *Attorney, Agent, or Firm* — Dinsmore & Shohl LLP

(57) ABSTRACT

A battery pack includes a plurality of battery cells stacked together, and a case that accommodates the battery cells. The battery cells include an endmost cell disposed at a farthest end on one side in a stacking direction, a first cell disposed adjacent to the endmost cell, and a second cell disposed adjacent to the first cell. Further, the case is configured such that a thermal resistance between an endmost contact portion that is a portion in contact with the endmost cell and a first contact portion that is a portion in contact with the first cell is higher than a thermal resistance between a second contact portion that is a portion in contact with the second cell and the first contact portion.

8 Claims, 3 Drawing Sheets

BATTERY PACK AND VEHICLE

CROSS-REFERENCE TO RELATED APPLICATION

This application claims priority to Japanese Patent Application No. 2022-087643 filed on May 30, 2022, incorporated herein by reference in its entirety.

BACKGROUND

1. Technical Field

The present disclosure relates to a battery pack and a vehicle.

2. Description of Related Art

Japanese Unexamined Patent Application Publication No. 2010-062093 (JP 2010-062093 A) discloses a battery pack including a plurality of batteries, a heat insulating layer that covers a partial surface of each of the batteries, and a heat dissipation layer that covers a surface different from the partial surface of each of the batteries. The heat of the battery is diffused through the heat dissipation layer.

SUMMARY

However, in JP 2010-062093 A, the heat of the battery is diffused through the heat dissipation layer. Therefore, the heat of one battery may increase an amount of heat generated by another battery. For example, when the amount of heat generated by an endmost battery is large, the amount of heat generated by the battery adjacent to the endmost battery 25 becomes relatively large. Therefore, it is desired to suppress the amount of heat generated by the battery adjacent to the endmost battery from becoming large when the amount of heat generated by the endmost battery is large.

The present disclosure provides a battery pack and a vehicle capable of suppressing the amount of heat generated by the battery cell adjacent to the endmost battery cell from becoming large when the amount of heat generated by the endmost battery cell is large.

A battery pack according to a first aspect of the present disclosure includes: a plurality of battery cells stacked together; and a case that accommodates the battery cells. The battery cells are configured to include an endmost cell disposed at a farthest end on at least one side in a stacking direction, a first cell disposed adjacent to the endmost cell, and a second cell disposed adjacent to the first cell on the side opposite to the endmost cell. The case is configured such that a thermal resistance between an endmost contact portion that is a portion in contact with the endmost cell and a first contact portion that is a portion in contact with the first cell is higher than a thermal resistance between a second contact portion that is a portion in contact with the second cell and the first contact portion. It should be noted that the term "contact" described above has a broad meaning including indirect contact via other members.

With such a configuration, the thermal resistance between the first contact portion and the second contact portion is smaller than the thermal resistance between the endmost contact portion and the first contact portion. This makes it possible to transfer more heat from the endmost cell to the second contact portion (the second cell) side as compared with the case where the thermal resistance between the first contact portion and the second contact portion is equal to or larger than the thermal resistance between the endmost contact portion and the first contact portion. As a result, the amount of heat accumulated in the first cell can be reduced. With the above, when the amount of heat generated by the endmost cell is large, it is possible to suppress the amount of heat generated by the first cell adjacent to the endmost cell from becoming large.

In the battery pack according to the first aspect above, the case may include a plate-shaped portion in which the endmost contact portion, the first contact portion, and the second contact portion are provided. In the plate-shaped portion, a thickness of a first portion between the first contact portion and the second contact portion may be larger than a thickness of a second portion between the endmost contact portion and the first contact portion. According to such a configuration, the thermal resistance of the first portion can be easily made smaller than the thermal resistance of the second portion.

In the battery pack according to the first aspect above, the case may include a plate-shaped portion in which the endmost contact portion, the first contact portion, and the second contact portion are provided. In the plate-shaped portion, a thermal resistance of a material of a first portion between the first contact portion and the second contact portion may be higher than a thermal resistance of a material of a second portion between the endmost contact portion and the first contact portion. According to such a configuration, the thermal resistance of the first portion can be easily made smaller than the thermal resistance of the second portion.

The battery pack according to the first aspect above may be configured to further include an end plate provided on the side of the endmost cell opposite to the first cell. A thermal resistance between the endmost cell and the end plate may be lower than a thermal resistance between the endmost cell and the first cell. According to such a configuration, the heat of the endmost cell is more likely to be transferred to the end plate side than to the first cell side. As a result, it is possible to suppress the amount of heat generated by the first cell from becoming large.

In the battery pack according to the first aspect above, the endmost cell and the end plate may be in contact with each other. According to such a configuration, a member that creates the thermal resistance is not provided between the endmost cell and the end plate. Therefore, the thermal resistance between the endmost cell and the end plate can be easily reduced. Further, the number of parts can be reduced and the configuration of the battery pack can be simplified as compared with the case where a member is provided between the endmost cell and the end plate.

The battery pack according to the first aspect above may further include: a first separator provided between the endmost cell and the first cell; and a second separator provided between the endmost cell and the end plate. A thermal resistance of the second separator may be lower than a thermal resistance of the first separator. According to such a configuration, the heat of the endmost cell can be easily transferred to the second separator side than to the first separator side because the thermal resistance of the second separator is smaller than the thermal resistance of the first separator, whereby it is possible to suppress the amount of heat generated by the first cell from becoming large. Further, when the second separator is provided between the endmost cell and the end plate, the amount of heat transferred from the endmost cell to the end plate can be easily adjusted.

In the battery pack according to the first aspect above, the end plate may be fixed to the case. A thermal resistance of a fixed portion where the end plate and the case are fixed may be higher than a thermal resistance between each of the battery cells and the case. According to such a configuration, heat transfer from the end plate to the case can be suppressed. As a result, heat transfer from the end plate to the cell through the case can be suppressed.

The battery pack according to the first aspect above may be configured to further include an elastic body that brings the plate-shaped portion and at least one of the battery cells into contact so as to be thermally conductive.

In the battery pack according to the first aspect above, the battery pack may be configured to be mounted on a rover that travels on a lunar surface. Here, because there is no air on the lunar surface, heat is suppressed from being released from the end plate to which the heat of the endmost cell is transferred. This suppresses the occurrence of temperature variations among the battery cells due to heat radiation from the end plate. Therefore, heat radiation from the end plate can be suppressed without providing a separator or the like between the endmost cell and the end plate. With the above, variations in the temperature between the battery cells can be suppressed while an increase in the number of parts is suppressed.

In addition, in a space battery pack, the thickness of the case is larger than that of a ground vehicle due to meteor countermeasures. Therefore, heat transfer occurs more easily than in a battery pack of the ground vehicle. Therefore, making the thermal resistance between the first contact portion and the second contact portion smaller than the thermal resistance between the endmost contact portion and the first contact portion is effective for suppressing the amount of heat generated by the first cell from becoming large in the space battery pack.

A vehicle according to a second aspect of the present disclosure is equipped with the battery pack according to the first aspect above. Such a configuration can provide a vehicle capable of suppressing the amount of heat generated by the first cell adjacent to the endmost cell from becoming large when the amount of heat generated by the endmost cell is large.

According to the present disclosure, when the amount of heat generated by the endmost battery cell is large, it is possible to suppress the amount of heat generated by the battery cell adjacent to the endmost battery cell from becoming large.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
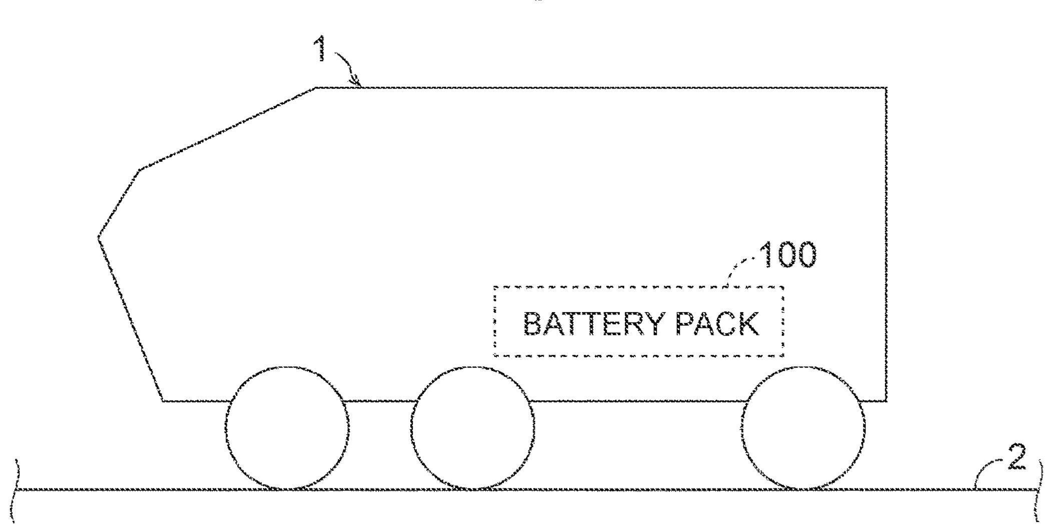
FIG. 1 is a diagram showing a lunar rover to which a battery pack according to an embodiment is mounted.

Hereinafter, an embodiment of the present disclosure will be described in detail with reference to the drawings. The same or corresponding parts in the drawings are designated by the same reference characters and repetitive description will be omitted.

FIG. 1 is a diagram showing the configuration of a lunar rover 1 according to the present embodiment. The lunar rover 1 travels on a lunar surface 2. The lunar rover 1 is a vehicle for exploring the lunar surface 2. It should be noted that the lunar rover 1 is an example of a "rover" and a "vehicle" of the present disclosure.

The lunar rover 1 includes a battery pack 100 mounted therein. The lunar rover 1 travels using electric power from the battery pack 100.

Figure 2:
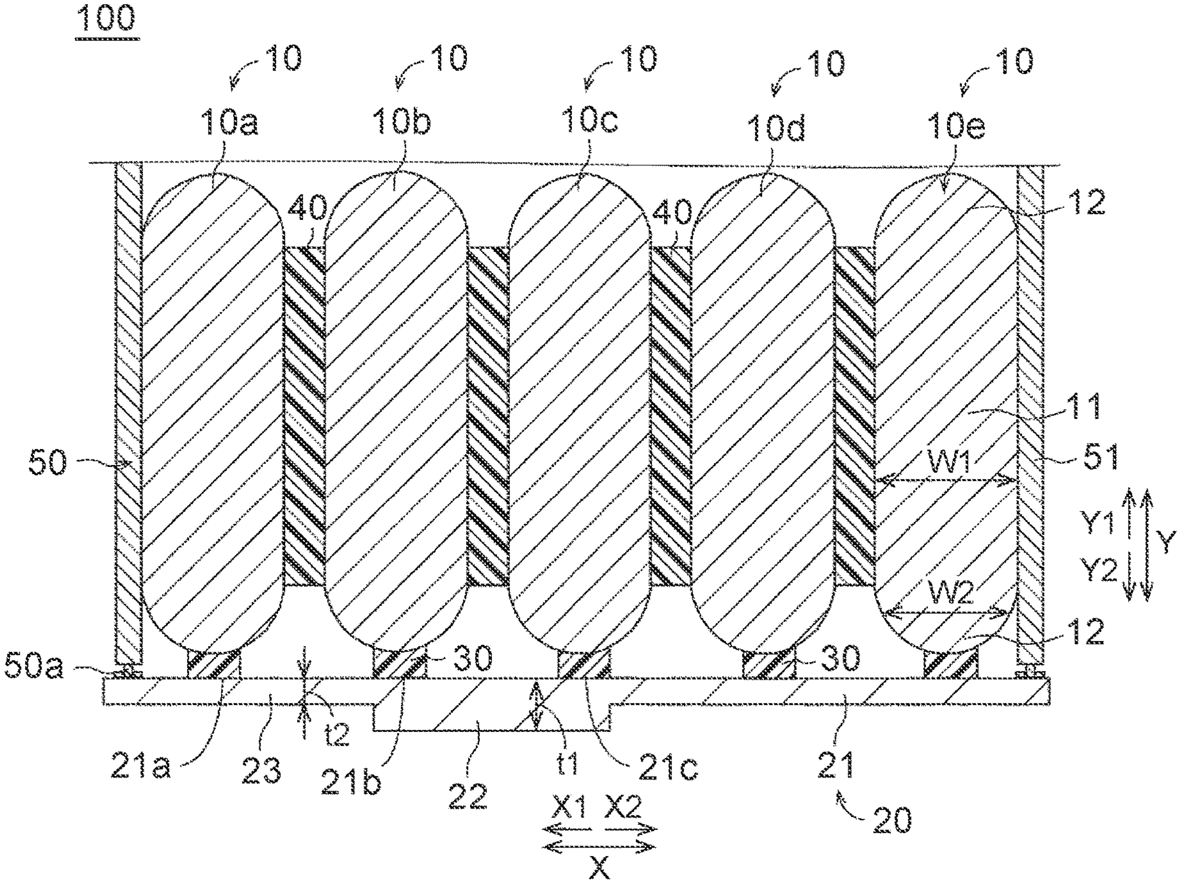
FIG. 2 is a sectional view showing the configuration of the battery pack according to the embodiment.

As shown in FIG. 2, the battery pack 100 includes a plurality of battery cells 10 stacked together. FIG. 2 shows an example in which five battery cells 10 are disposed side by side along an X direction. It should be noted that the X direction is an example of a "stacking direction" of the present disclosure.

The battery cells 10 include an endmost cell 10*a* disposed at the farthest end on the X1 side, a first cell 10*b* disposed adjacent to the endmost cell 10*a*, and a second cell disposed adjacent to the first cell 10*b* on the side opposite to the endmost cell 10*a*. Further, the battery cells 10 include a third cell 10*d* disposed adjacent to the second cell 10*c* on the side opposite to the first cell 10*b*, and an endmost cell 10*e* disposed at the farthest end on the X2 side. It should be noted that the battery cells 10 have the same configuration as each other.

Each of the battery cells 10 includes a flat portion 11 and curved portions 12. The curved portions 12 are located at end portions of the battery cell 10 on the Y1 side and on the Y2 side, respectively. The flat portion 11 is provided between the two curved portions 12 described above. The flat portion 11 and each of the two curved portions 12 are connected to each other.

The flat portion 11 has a constant width W1 in the X direction. Further, a width W2 of each curved portion 12 in the X direction is smaller than the width W1 of the flat portion 11.

The curved portions 12 each have a semicircular shape in a sectional view along an XY plane (the sectional view shown in FIG. 2). With the above, the mechanical strength of the battery cell 10 can be increased and the weight of the battery cell 10 can be reduced as compared with the case where the battery cell 10 has a rectangular shape. It should be noted that a Y direction is a direction orthogonal to the X direction.

The battery pack 100 also includes a case 20 that accommodates the battery cells 10. The case 20 includes a lower case 21 provided on the Y2 side of the battery cells 10 so as to extend along the X direction. Each of the battery cells 10 is in contact with the lower case 21. The lower case 21 is formed in a plate shape. The case 20 is made of aluminum, for example. Note that the lower case 21 is an example of a "plate-shaped portion" of the present disclosure.

Each of the battery cells 10 and the lower case 21 are in contact with each other via a heat conductor 30. The heat conductor 30 conducts heat between the battery cell 10 and the lower case 21. The heat conductor 30 is made of, for example, a resin or the like having relatively low thermal resistance (relatively high thermal conductivity) and relatively high elasticity (viscosity). Even when there are variations in size, disposition position, etc. among the battery cells 10, the heat conductor 30 can absorb the variations due to the relatively high elasticity (viscosity) of the heat conductor 30.

The case 20 (the lower case 21) includes an endmost contact portion 21*a* that is a portion in contact with the endmost cell 10*a*, a first contact portion 21*b* that is a portion in contact with the first cell 10*b*, and a second contact portion 21*c* that is a portion in contact with the second cell 10*c*.

Further, the case 20 (the lower case 21) includes a first portion 22 between the first contact portion 21*b* and the second contact portion 21*c* and a second portion 23 between the endmost contact portion 21*a* and the first contact portion 21*b*.

Here, when the amount of heat generated by the endmost cell 10*a* is large, it is desired to suppress the amount of heat generated by the first cell 10*b* adjacent to the endmost cell 10*a* from becoming large.

Therefore, in the present embodiment, the battery pack 100 is configured such that a thermal resistance between the first contact portion 21*b* and the second contact portion 21*c* is smaller than a thermal resistance between the endmost contact portion 21*a* and the first contact portion 21*b*.

Specifically, a thickness t1 of the first portion 22 between the first contact portion 21*b* and the second contact portion 21*c* is larger than a thickness t2 of the second portion 23 between the endmost contact portion 21*a* and the first contact portion 21*b*. For example, the thickness t1 is at least twice the thickness t2.

Further, the first portion 22 is provided to extend from the first contact portion 21*b* to the second contact portion 21*c*. In other words, an end portion of the first portion 22 on the X1 side and an end portion of the first portion 22 on the X2 side are the first contact portion 21*b* and the second contact portion 21*c*, respectively. Further, the second portion 23 is provided to extend from the endmost contact portion 21*a* to the first contact portion 21*b*. In other words, an end portion of the second portion 23 on the X1 side and an end portion of the second portion 23 on the X2 side are the endmost contact portion 21*a* and the first contact portion 21*b*, respectively.

Further, the lower case 21 is formed of a single plate-shaped member. The lower case 21 is molded such that only the portion corresponding to the first portion 22 has a large thickness.

Further, the battery pack 100 also includes a plurality of separators 40, each of which is provided to be interposed between the battery cells 10 adjacent to each other. Specifically, each separator 40 is provided so as to be interposed between the flat portions 11 of the battery cells 10 adjacent to each other. The separator 40 is made of a heat insulating material (for example, a foamed plastic-based heat insulating material). It should be noted that the separator 40 may be made of a fiber-based heat insulating material.

Further, the battery pack 100 also includes an end plate 50 provided on the side (the X1 side) of the endmost cell 10*a* opposite to the first cell 10*b*. The end plate 50 is provided so as to cover the entire endmost cell 10*a* from the X1 side. It should be noted that the end plate 50 is made of aluminum, for example.

Further, the battery pack 100 also includes an end plate 51 disposed on the X2 side of the endmost cell 10*e*. The end plate 51 is provided so as to cover the entire endmost cell 10*e* from the X2 side. It should be noted that the end plate 51 is made of aluminum, for example.

Here, in the present embodiment, the thermal resistance between the endmost cell 10*a* and the end plate 50 is smaller than the thermal resistance between the endmost cell 10*a* and the first cell 10*b*. Specifically, the endmost cell 10*a* and the end plate 50 are in contact with each other. In other words, the endmost cell 10*a* and the end plate 50 are in direct contact with each other without a member that creates a thermal resistance interposed therebetween. With the above, the heat of the endmost cell 10*a* is directly transferred to the end plate 50. It should be noted that the end plate 50 is in close contact with the flat portion 11 of the endmost cell 10*a*.

Further, the endmost cell 10*e* and the end plate 51 are in direct contact with each other without a member that creates a thermal resistance interposed therebetween. The end plate 51 is in close contact with the flat portion 11 of the endmost cell 10*e*.

Further, the end plate 50 is fixed to the case 20 (the lower case 21). For example, a connecting portion 50*a* connected to the lower case 21 is provided at an end portion of the end plate 50 on the lower case 21 side (the Y2 side).

Figure 3:
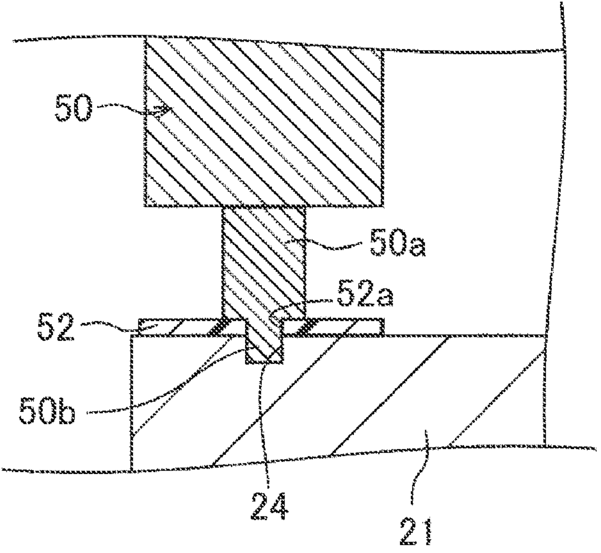
FIG. 3 is a partially enlarged view showing the configuration of a fixed portion between an end plate and a case of the battery pack according to the embodiment.

As shown in FIG. 3, the end plate 50 is fixed to the lower case 21 by inserting a fastening portion 50*b* provided at the tip end of the connecting portion 50*a* into a fastening hole 24 of the lower case 21. Alternatively, the end plate 50 may be fixed to the lower case 21 by welding the connecting portion 50*a* to the lower case 21.

Here, in the present embodiment, the thermal resistance of a fixed portion where the end plate 50 and the case 20 are fixed is larger than the thermal resistance between each of the battery cells 10 and the case 20 (the thermal resistance of the heat conductor 30).

Specifically, a heat insulating washer 52 is provided on the fixed portion. The heat insulating washer 52 is provided so as to be interposed between the connecting portion 50*a* of the end plate 50 and the lower case 21. It should be noted that the fastening portion 50*b* of the connecting portion 50*a* penetrates through a through hole 52*a* of the heat insulating washer 52.

With the above, heat transfer from the end plate 50 to the lower case 21 can be suppressed by the heat insulating washer 52. The heat insulating washer 52 is made of plastic, polyamide, or the like, for example. It should be noted that a heat insulating collar may be used instead of the heat insulating washer 52.

Further, the end plate 51 is connected to the lower case 21 in the same configuration as that of the end plate 50. Therefore, the detailed description will not be repeated.

As described above, in the present embodiment, the thermal resistance between the first contact portion 21*b* and the second contact portion 21*c* is smaller than the thermal resistance between the endmost contact portion 21*a* and the first contact portion 21*b*. This makes it easier for the heat of the endmost cell 10*a* to transfer toward the second contact portion 21*c* (the second cell 10*c*), and therefore the amount of heat input to the first cell 10*b* can be reduced. As a result, it is possible to suppress the amount of heat generated by the first cell 10*b* from becoming large.

Further, in the above-described embodiment, an example in which the endmost cell 10*a* and the end plate 50 are in contact with each other has been shown. However, the present disclosure is not limited to this. The endmost cell 10*a* and the end plate 50 do not need to be in contact with each other.

Figure 4:
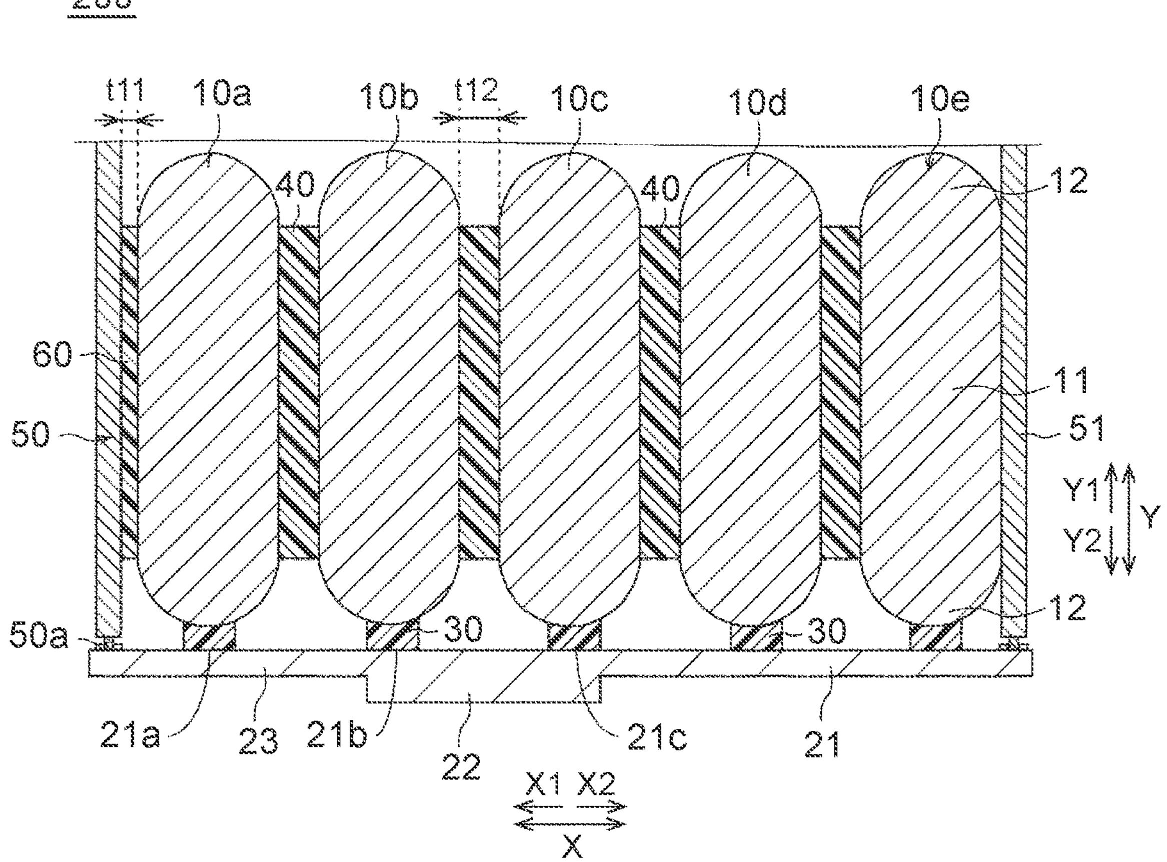
FIG. 4 is a sectional view showing the configuration of a battery pack according to a first modification of the embodiment.

Specifically, as shown in FIG. 4, a battery pack 200 may include a separator 60 provided between the endmost cell 10*a* and the end plate 50. Here, the thermal resistance of the separator 60 is smaller than that of the separator 40. Specifically, a thickness t11 of the separator 60 in the X direction is smaller than a thickness t12 of the separator 40 in the X direction. For example, the thickness t11 may be half or less than the thickness t12. It should be noted that the separator 60 is made of the same material as that of the separator 40.

Further, the thickness t11 of the separator 60 and the thickness t12 of the separator 40 may be equal to each other, and the separator 60 may be made of a material having a lower thermal resistance than that of the separator 40.

Further, in the above-described embodiment, an example in which the thermal resistance between the first cell 10*b* and the second cell 10*c* is reduced has been described. However, the present disclosure is not limited to this. The thermal resistance between the second cell 10*c* and the third cell 10*d* may be made smaller than the thermal resistance between the endmost cell 10*e* on the X2 side and the third cell 10*d*.

Further, in the above-described embodiment, an example in which the lower case 21 is formed of a single plate-shaped member has been described. However, the present disclosure is not limited to this. The lower case 21 does not need to be formed of a single plate-shaped member.

Figure 5:
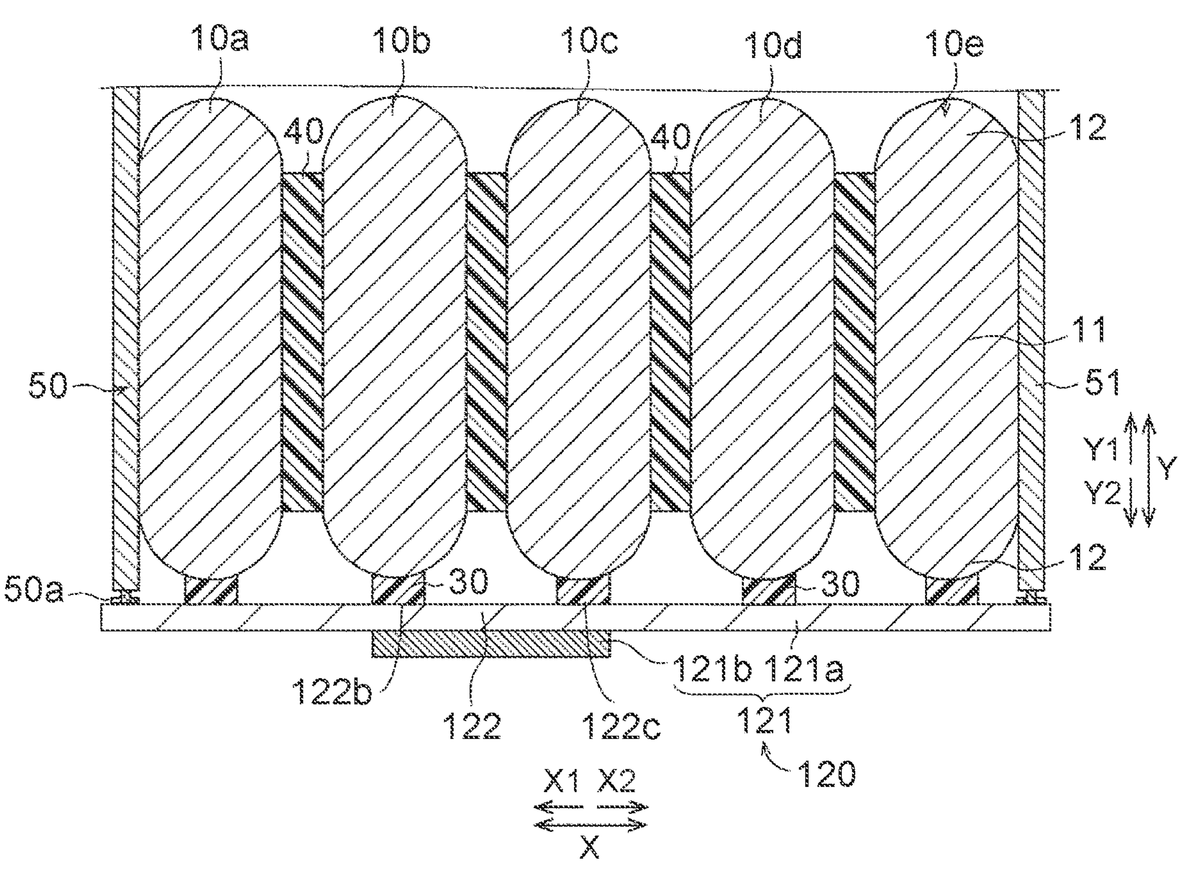
FIG. 5 is a sectional view showing the configuration of a battery pack according to a second modification of the embodiment.

Specifically, as shown in FIG. 5, a case 120 of a battery pack 300 includes a lower case 121. The lower case 121 is composed of a flat plate-shaped member 121*a* and a flat plate-shaped member 121*b*. The plate-shaped member 121*b* is attached to the plate-shaped member 121*a*. Specifically, the plate-shaped member 121*b* is attached to a position corresponding to a portion 122 between a first contact portion 122*b* (a contact portion between the first cell 10*b* and the plate-shaped member 121*a*) and a second contact portion 122*c* (a contact portion between the second cell 10*c* and the plate-shaped member 121*a*) in the plate-shaped member 121*a*. The plate-shaped member 121*b* may be detachably attached to the plate-shaped member 121*a*. Further, the plate-shaped member 121*b* is made of a material having a lower thermal resistance than that of the plate-shaped member 121*a*. It should be noted that the plate-shaped member 121*b* may be made of the same material as that of the plate-shaped member 121*a*, or may be made of a material having a larger thermal resistance than that of the plate-shaped member 121*a*. It should be noted that a portion composed of the portion 122 and the plate-shaped member 121*b* is an example of a "first portion" of the present disclosure.

Further, in the above-described embodiment, an example in which the first portion 22 having the thickness t1 is provided to extend from the first contact portion 21*b* to the second contact portion 21*c* has been described. However, the present disclosure is not limited to this. The first portion 22 may extend beyond the second contact portion 21*c* toward the third cell 10*d*. Further, the first portion 22 may extend beyond the first contact portion 21*b* toward the endmost cell 10*a*.

Further, in the above-described embodiment, an example in which the thermal resistance of the case 20 is partially changed by partially changing the thickness of the case 20 has been described. However, the present disclosure is not limited to this. For example, the thermal resistance of the case may be partially changed by partially changing the material of the case.

Further, in the above-described embodiment, an example in which the battery pack 100 is mounted on the lunar rover 1 has been described. However, the present disclosure is not limited to this. For example, the battery pack 100 may be mounted on a ground vehicle.

Further, in the above-described embodiment, an example in which each of the battery cells 10 and the lower case 21 are in contact with each other via the heat conductor 30 has been described. However, the present disclosure is not limited to this. Each of the battery cells 10 and the lower case 21 may be in direct contact with each other.

It should be noted that the configurations described in the above embodiment and the various modifications described above may be arbitrarily combined and implemented.

The embodiment disclosed herein should be considered as illustrative and not restrictive in all respects. The scope of the present disclosure is shown by the claims, rather than the above embodiment, and is intended to include all modifications within the meaning and the scope equivalent to those of the claims.

What is claimed is:

1. A battery pack comprising:

a plurality of battery cells stacked together;

an end plate; and a first separator;

a second separator;

a case that accommodates the battery cells, wherein:

the battery cells are configured to include an endmost cell disposed at a farthest end on at least one side in a stacking direction, a first cell disposed adjacent to the endmost cell, and a second cell disposed adjacent to the first cell on the side opposite to the endmost cell;

the case is configured such that a thermal resistance between an endmost contact portion that is a portion in contact with the endmost cell and a first contact portion that is a portion in contact with the first cell is higher than a thermal resistance between a second contact portion that is a portion in contact with the second cell and the first contact portion;

the end plate is provided on the side of the endmost cell opposite to the first cell;

a thermal resistance between the endmost cell and the end plate is lower than a thermal resistance between the endmost cell and the first cell;

the first separator is provided between the endmost cell and the first cell;

the second separator is provided between the endmost cell and the end plate; and a thermal resistance of the second separator is lower than a thermal resistance of the first separator.

2. The battery pack according to claim 1, wherein:

the case is configured to include a plate-shaped portion in which the endmost contact portion, the first contact portion, and the second contact portion are provided; and a thickness of a first portion between the first contact portion and the second contact portion is larger than a thickness of a second portion between the endmost contact portion and the first contact portion.

3. The battery pack according to claim 2, further comprising an elastic body that brings the plate-shaped portion and at least one of the battery cells into contact so as to be thermally conductive.

4. The battery pack according to claim 1, wherein:

the case is configured to include a plate-shaped portion in which the endmost contact portion, the first contact portion, and the second contact portion are provided; and a thermal resistance of a material of a first portion between the first contact portion and the second contact portion is higher than a thermal resistance of a material of a second portion between the endmost contact portion and the first contact portion.

5. The battery pack according to claim 1, wherein the endmost cell and the end plate are in contact with each other.

6. The battery pack according to claim 5, wherein the battery pack is configured to be mounted on a rover that travels on a lunar surface.

7. The battery pack according to claim 1, wherein:

the end plate is fixed to the case; and a thermal resistance of a fixed portion where the end plate and the case are fixed is higher than a thermal resistance between each of the battery cells and the case.

8. A vehicle equipped with the battery pack according to claim 1.

* * * * *